United States Patent [19]
Matier et al.

[11] 3,821,244
[45] June 28, 1974

[54] 2-AMINO-4-PHENYL-2-IMIDAZOLINES

[75] Inventors: William Lesley Matier; William Timmey, Evansville, both of Ind.

[73] Assignee: Mead Johnson & Company, Evansville, Ind.

[22] Filed: July 3, 1972

[21] Appl. No.: 268,380

Related U.S. Application Data

[63] Continuation-in-part of Ser. No. 172,321, Jan. 16, 1971, abandoned.

[52] U.S. Cl........ 260/309.6, 260/240 G, 260/309.7, 260/570.5 P, 260/465 E, 424/273
[51] Int. Cl............................................. C07d 49/34
[58] Field of Search........... 260/309.6, 309.7, 240 G

[56] References Cited
OTHER PUBLICATIONS
C. A. 61: 652F (1964) Wollweber et al.

*Primary Examiner*—Henry R. Jiles
*Assistant Examiner*—S. D. Winters
*Attorney, Agent, or Firm*—Robert E. Carnahan; Robert H. Uloth

[57] ABSTRACT

The novel compounds of this invention are of the imidazoline class of heterocycles having substituents in the 2 and 4 imidazoline ring positions and optionally in the 3-position. Substituents in the 2-position include amino, hydroxyamino, alkylamino, benzylamino, halobenzylamino, dihalo benzylamino, allylamino, cycloalkylamino, hydrazino, and alkylidenehydrazino. Optional 3-position subsitutents are alkyl and benzyl. The substituent in the 4-position is comprised of phenyl or R-phenyl in which the R-substituent is selected from halogen, alkyl, benxyloxy, alkoxy, dialkoxy, 3-hydroxy, 3,4-dihydroxy, trifluoromethyl, phenyl, halophenyl, or alkylphenyl. The novel imidazolines have antihypertensive and neuronal blocking properties. They are prepared by cyclization of appropriately substituted 1-phenylethylenediamines with cyanogen bromide or by displacement of a methylmercapto grouping from an appropriately substituted 2-methylthioimidazoline. Representative embodiments of this invention are 2-amino-4-(4-chlorophenyl)-2-imidazoline and 2-amino-4-(3,4-dichlorophenyl)-2-imidazoline.

29 Claims, No Drawings

2-AMINO-4-PHENYL-2-IMIDAZOLINES

CROSS-REFERENCE TO RELATED APPLICATION

This application is a continuation-in-part of copending application Ser. No. 172,321, filed Aug. 16, 1971, now abandoned.

BACKGROUND OF THE INVENTION

The present invention is concerned with substituted imidazolines and acid addition salts thereof. This invention relates to novel imidazolines displaying a useful range of biological properties. They are, specifically, neuronal blocking and/or antihypertensive agents. Neuronal blocking agents are capable of producing a pharmacological effect similar in many respects to a sympathectomy. Such agents are of interest in experimental biology, comparative pharmacology, and in the treatment of hypertension. For example, guanethidine, a neuronal blocking agent structurally unrelated to the imidazolines of the present invention, is a therapeutically effective antihypertensive agent.

The imidazolines of this invention bear a structural resemblance to 2-amino-4-phenyl-2-imidazoline which is a prior art imidazoline reported to be a ganglionic stimulant described by H. Wollweber, et al., Med. Chem., Abhandl. Med. Chem. Forschungstatten Farbwerke Hoechst A.G., 7, 256 (1963), CA 61:652f (1964). As an antihypertensive and a neuronal blocking agent, we have found 2-amino-4-phenyl-2-imidazoline to be essentially inactive, whereas the novel imidazolines claimed herein have significant antihypertensive and/or neuronal blocking activity.

SUMMARY OF THE INVENTION

This invention relates generally to a series of novel imidazolines. More particularly, it relates to imidazolines having substituents in the 2, 4, and optionally in the 3 positions of the imidazoline ring and to the non-toxic pharmaceutically acceptable acid addition salts thereof. The imidazolines of this invention possess valuable pharmacological properties, including neuronal blocking activity, which render them useful as antihypertensive agents. This invention is further concerned with a therapeutic process for producing a neuronal blocking effect in mammals comprising the administration of the imidazolines of the present invention thereto.

The novel imidazolines of the present invention are comprised of imidazolines which have substituents in the 2, 3, and 4 positions represented by A, B, and Y radicals respectively.

Radical B in the 3-position represents hydrogen, lower alkyl and benzyl groupings.

Radical Y in the 4-position is selected from the group consisting of phenyl and an R-phenyl radical of the formula:

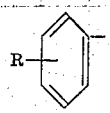

When Y is the phenyl radical, A is selected from a group consisting of benzylamino, halobenzylamino, e.g., 4-chlorobenzylamino, 2-chlorobenzylamino, 2,6-dichlorobenzylamino, 3,4-dichlorobenzylamino; and 3-dimethylaminopropylamino.

When Y is the R-phenyl radical, R is halogen, e.g., chlorine, fluorine, bromine and iodine; lower alkyl, benzyloxy, lower alkoxy, lower dialkoxy, 3-hydroxy, 3,4-dihydroxy, trifluoromethyl, phenyl, 4-halophenyl, and 4-(lower alkyl)phenyl. When R is selected from the group consisting of halogen and lower alkyl, the phenyl ring can optionally have up to 2 additional substituents which are independently selected from halogen and lower alkyl.

Radical A in the 2 position when Y is R-phenyl represents a member of the group consisting of amino, hydroxyamino, lower alkylamino, benzylamino, halobenzylamino, dihalobenzylamino, allylamino, cycloalkylamino from three to six carbon atoms inclusive, e.g., cyclopropylamino, cyclobutylamino, cyclopentylamino, cyclohexylamino; hydrazino, halobenzylidenehydrazino, e.g., 4-chlorobenzylidenehydrazino, 2-chlorobenzylidenehydrazino; dihalobenzylidenehydrazino, e.g., 3,4-dichlorobenzylidenehydrazino, 2,6-dichlorobenzylidenehydrazino; and alkylidenehydrazino.

It is to be understood that by the term "lower alkyl" and "lower alkoxy" as used herein, it is meant that the carbon chains which comprise these groups include both straight and branched chain carbon radicals of one to four carbon atoms inclusive. Exemplary of these carbon chain radicals are methyl, ethyl, propyl, isopropyl, 1-butyl, 1-methylpropyl, 2-methylpropyl, and tert.-butyl.

By the term "independently selected" as used herein it is meant that the halogen or lower alkyl substituents may or may not be identical when the R group in the phenyl radical consists of halogen and lower alkyl.

By the term "alkylidene," as utilized herein, it is intended to refer to carbon chains of from two to six carbon atoms inclusive which are double-bonded through a single carbon atom thereof to the hydrazine group. They are derived from alkyl aldehydes such as acetaldehyde, propionaldehyde, butyraldehyde, isobutyraldehyde, hexaldehyde and the like, or alkanones such as acetone, methylethylketone, diethylketone, 2-heptanone and the like. Exemplary of suitable alkylidene radicals are illustratively represented by the formula:

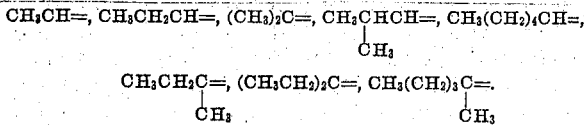

It is to be understood that the term "non-toxic pharmaceutically acceptable acid addition salts" used herein denotes a combination of the imidazoline bases of the present invention with relatively non-toxic inorganic or organic acids. Illustrative of suitable acids which may be used are sulfuric, hydrochloric, phosphoric, hydrobromic, hydriodic, sulfamic, methanesulfonic, benzenesulfonic, para-toluenesulfonic, acetic, lactic, succinic, maleic, mucic, tartaric, citric, gluconic, benzoic, cinnamic, isethionic, fumaric, and related acids.

As will be clear to those skilled in the art, the subject imidazolines and their salts can exist in more than one tautomeric modification as illustrated by structures 1-5 which depict various positional tautomers of 2-amino-4-(4-chlorophenyl)imidazoline and 2-amino-3-benzyl-4-(4-chlorophenyl) imidazoline bases.

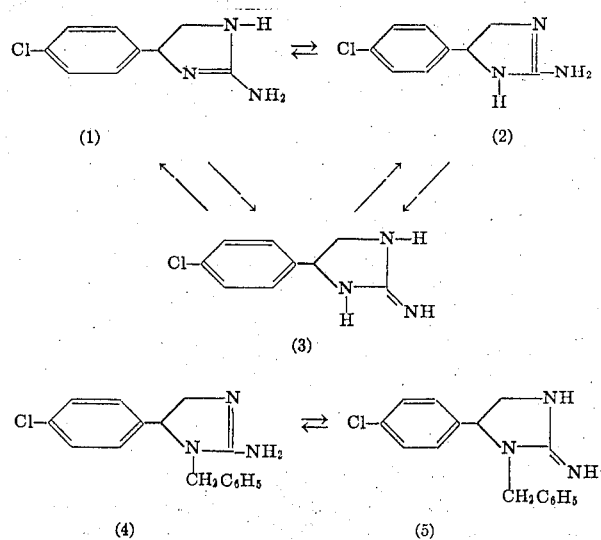

Without being bound by any theory, we believe that protonated imidazolines, as is the case with the acid addition salts, are best represented by a delocalized double bond rather than fixed double bonds as shown in the above tautomeric forms. Illustrating a delocalized double bond is structure 6 which represents a salt of 2-amino-4-(4-chlorophenyl)-2-imidazoline in which $^-X$ symbolizes an anion.

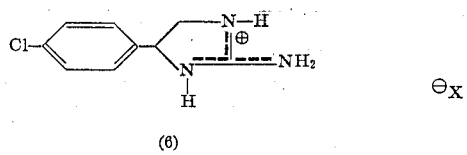

Evidence that double bonds in the subject imidazolines are delocalized rather than fixed is provided by infrared spectra which clearly show strong NH absorption in the free amino region (3,100–3,400 Cm.$^{-1}$) rather than in the ammonium region and strong C=N absorption at 1,685 Cm.$^{-1}$ which is characteristic of a disubstituted guanidinium.

The novel imidazolines which are the subject of the present invention can be depicted according to the Formulas I and II wherein the symbol "B" has the meaning defined above. Dotted lines which extend from ring position 2 represent a delocalized bond which is intended to represent the interchangeable tautomeric forms of the novel imidazolines illustrated by structures 1–5.

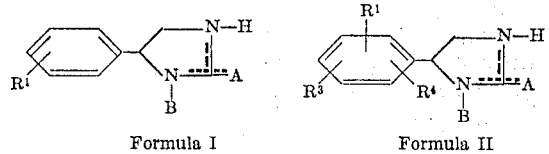

In Formula I, R$^1$ can be hydrogen in which case the symbol A signifies a member of the group consisting of benzylamino, halobenzylamino and 3-dimethylaminopropylamino.

In Formula I, R$^1$ can also signify a halogen, lower alkyl, benzyloxy, lower alkoxy, lower dialkoxy, 3-hyroxy, 3,4-dihydroxy, trifluoromethyl, phenyl, 4-halophenyl, and 4-(lower alkyl)phenyl. Whenever R$^1$ is as described above, but excluding hydrogen, A signifies a member of the group consisting of amino, hydroxyamino, lower alkylamino, benzylamino, halobenzylamino, dihalobenzylamino, allylamino, cycloalkylamino, hydrazino, halobenzylidenehydrazino, dihalobenzylidenehydrazino, and alkylidenehydrazino. In Formula II, R$^2$ signifies halogen or lower alkyl and R$^3$ and R$^4$ signify independently selected halogen or lower alkyl; and A is as above when R$^1$ excludes hydrogen. By "halo" and "halogen" it is intended to include all four halogens.

It will be readily apparent to those skilled in the art that compounds of the present invention exist as stereoisomers inasmuch as position "4" of the imidazoline ring contains an asymmetric carbon atom and it is to be understood that all stereoisomeric forms of the substances of Formulas I and II are included within the scope of the present invention. Racemic modifications of the imidazolines can be resolved into optical antipodes according to procedures known to the art such as, by reaction with optically active acids to provide diastereoisomeric salts. Separation of these salts according to physico-chemical properties and liberation of the optically active bases from the salts.

An alternate and preferred method providing the optical antipodes of the substances of this invention is to employ optically pure 1-phenylethylenediamines. These amines can be cyclized to the optically active imidazolines of the present invention according to methods hereinafter described.

A preferred process for preparing novel imidazolines of the present invention wherein the A radical is limited to amino is represented by the following reaction scheme in which R and B have the same meaning given above.

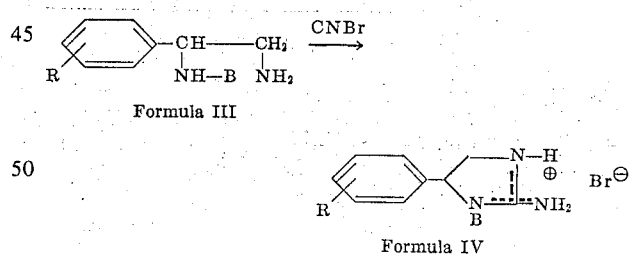

The cyclization proceeds when the 1-phenylethylenediamine and cyanogen bromide are contacted and mixed in an inert organic solvent as a reaction medium. Benzene is a preferred solvent for the cyclization but other solvents may also be employed, such as, ether, toluene, acetonitrile, chloroform, and the like. Preferably, the reaction is conducted at a temperature of about 25°C. and is complete in from about 0.5 hr. to 16 hr. Reaction temperatures appreciably below room temperature can be used but their use may extend the reaction time. Similarly, reaction temperatures higher than 25°C. can be employed with a concomitant decrease in reaction time.

After the reaction is complete, the product is obtained by conventional methods, for example by filtration and crystallization from a suitable solvent, such as alkanols, water, alkanones, and ethers.

Displacement of the 2-methylthio functionally of 2-methylthioimidazolines according to the following reaction scheme provides imidazolines wherein the symbols "B," "Y," and "A" are as defined above.

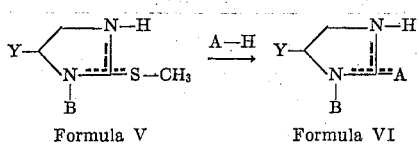

Formula V          Formula VI

This is a particularly preferred method for the preparation of the novel imidazolines wherein "A" is limited to the group consisting of hydroxyamino, lower alkylamino, benzylamino, halobenzylamino, 2-(3-dimethylaminopropylamino), and hydrazino.

The 2-methylthioimidazoline intermediates are obtained by cyclizing 1-phenylethylenediamines with carbon disulfide according to the method described in U.S. Pat. No. 3,274,209 to 2-thioimidazolines which are then S-methylated by treatment with methyl iodide. Illustrative of the cyclization and subsequent S-methylation and displacement reactions is the following transformation of 1-(2-chlorophenyl)ethylenediamine into 4-(2-chlorophenyl)-2-hydrazino-2-imidazoline hydriodide as depicted below in structures 7–10.

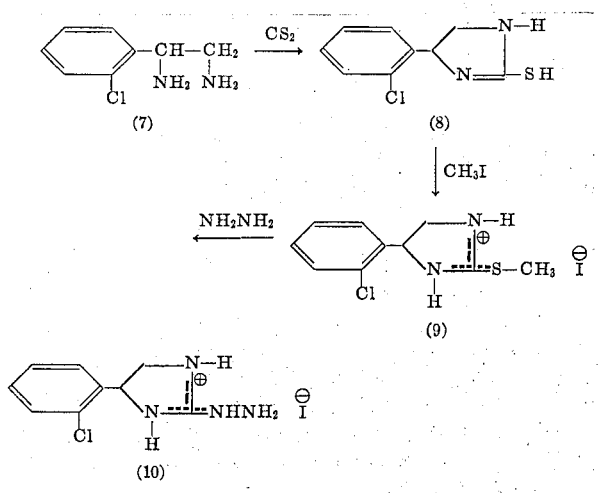

Novel imidazolines wherein the A radical in the 2 position is an alkylidenehydrazino or halobenzylidenehydrazino substituent are produced from the corresponding 2-hydrazinoimidazolines by conventional procedures for the preparation of hydrazones. For example, condensation of the appropriate 2-hydrazinoimidazoline with an alkyl aldehyde, alkanone, or halobenzaldehyde in an inert solvent with a catalytic amount of acid and the elimination of water provides 2-alkylidenehydrazinoimidazolines and 2-(halobenzylidenehydrazino)imidazolines of the present invention.

The 1-phenylethylenediamine intermediates which are used as starting materials for the preparation of the imidazolines of the present invention are obtained by methods in themselves well known; refer to Wagner and Zook, Synthetic Organic Chemistry (Wiley) pages 605, 606, 658; L. E. Kholodov, et al., J. Org. Chem. USSR, 1, 2103 (1965); and Ruggen, et al., Gazz. Chim. Ital., 54, 554 (1924).

A preferred method comprises cyanoammonolysis of the corresponding substituted benzaldehyde according to the Strecker synthesis to provide α-aminophenylacetonitriles or α-benzylaminophenylacetonitriles which are then reduced by catalytic or chemical means to the 1-phenylethylenediamines.

Some of the substituted benzaldehydes which may be used are:
4-chlorobenzaldehyde,
2-chlorobenzaldehyde,
4-bromobenzaldehyde,
2,4-dichlorobenzaldehyde,
2,6-dichlorobenzaldehyde,
3,4-dichlorobenzaldehyde,
2,4-dibromobenzaldehyde,
4-methylbenzaldehyde,
4-ethylbenzaldehyde,
4-propylbenzaldehyde,
4-isopropylbenzaldehyde,
4-butylbenzaldehyde,
4-tert.-butylbenzaldehyde,
4-fluorobenzaldehyde,
4-trifluoromethylbenzaldehyde,
3-trifluoromethylbenzaldehyde,
4-methoxybenzaldehyde,
3-methoxybenzaldehyde,
3-benzyloxybenzaldehyde,
3,4-dimethoxybenzaldehyde,
3,4-dibenzyloxybenzaldehyde,
and the like.

Reduction of α-aminonitriles such as α-amino-2,6-dichlorophenylacetonitrile is carried out with diborane or lithium aluminum hydride in an inert solvent, e.g., tetrahydrofuran or ether. With α-benzylaminophenylacetonitriles, the preferred route is first reduction with lithium aluminum hydride in ether at 0°C. to a β-benzylaminophenethylamine which is then debenzylated catalytically employing palladium on carbon catalyst, or cyclized with cyanogen bromide as described above.

The imidazolines of the present invention have valuable neuronal blocking properties and thus are particularly useful in experimental and comparative pharmacology and in treating conditions in mammals responsive to administration of such agents. They are of particular importance in the treatment of hypertensive mammals, substantially reducing blood pressure when orally or parenterally administered thereto.

Neuronal blocking effects can be demonstrated in standard in vitro and in vivo pharmacological tests such as, for example, the rabbit jejunum test of B. Finkelman, J. Physiol., 70, 145 (1930). In this test, electrodes are threaded to mesenteric periarterial nerves of the rabbit jejunum and the preparation is mounted in Tyrode's solution aerated with 95 percent oxygen and 5 percent carbon dioxide. Spontaneous motility is measured employing a base line tension of 1 gram and a 2 millisecond electrical pulse is then delivered to the electrodes at a frequency of 50 per second for 10 seconds. The lowest voltage is selected for each tissue which produces greater than 80 percent inhibition of spontaneous motility. Antagonism of the electrical nerve stimulation expressed as percent inhibition is determined by comparison of pre-drug control response with those obtained at 5, 10, 15 and 20 minute intervals after drug addition. A blocking concentration ($BC_{50}$) is estimated for the test drug as the molar concentration which reduces the effect of nerve stimulation by 50 percent at the 20 minute exposure interval. Well known neuronal blocking agents such as guanethidine and bethanidine have a $BC_{50}$ of $3 \times 10^{-6}$ molar.

Results obtained in this test with representative imidazolines of the present invention are reported in Table I. Activity is expressed as a multiple of the neuronal blocking activity of guanethidine which is taken as unity.

TABLE I.

NEURONAL BLOCKING ACTIVITY
RELATIVE TO GUANETHIDINE (=1)

| Example[a] | Chemical Name | Rel. Act. |
|---|---|---|
| 1 | 2-amino-4-(2-chlorophenyl)-2-imidazoline hydrobromide | 4.3 |
| 1 | 2-amino-4-(2-chlorophenyl)-2-imidazoline hydrobromide levorotatory | 3.0 |
| 1 | 2-amino-4-(2-chlorophenyl)-2-imidazoline hydrobromide dextrorotatory | 3.8 |
| 2 | 2-benzylamino-4-(2-chlorophenyl)-2-imidazoline hydriodide | |
| 3 | 4-(2-chlorophenyl)-2-hydrazino-2-imidazoline hydriodide | 10.0 |
| 4 | 4-(2-chlorophenyl)-2-hydroxyamino-2-imidazoline hydrochloride | 1.5 |
| 5 | 4-(2-chlorophenyl)-2-isopropylidenehydrazino-2-imidazoline hydriodide | 10.0 |
| 6 | 2-amino-4-(4-chlorophenyl)-2-imidazoline hydrobromide | 2.0 |
| 7 | 2-amino-4-(4-bromophenyl)-2-imidazoline hydrobromide | 0.6 |
| 8 | 2-amino-4-(2,4-dichlorophenyl)-2-imidazoline hydrobromide | 3.0 |
| 9 | 2-amino-4-(2,6-dichlorophenyl)-2-imidazoline hydrobromide | 3.0 |
| 10 | 2-amino-4-(3,4-dichlorophenyl)-2-imidazoline hydrobromide | 1.5 |
| 11 | 2-amino-4-(m-tolyl)-2-imidazoline hydrobromide | 0.43 |
| 12 | 2-amino-4-(p-tolyl)-2-imidazoline hydrobromide | 3.0 |
| 13 | 2-amino-4-(4-methoxyphenyl)-2-imidazoline hydrobromide | 1.0 |
| 14 | 2-amino-4-(4-benzyloxyphenyl)-2-imidazoline hydrobromide | 0.75 |
| 15 | 2-amino-4-(4-biphenyl)-2-imidazoline hydrobromide | 0.6 |
| 16 | 2-amino-1-benzyl-5-(2-chlorophenyl)-2-imidazoline hydrobromide | 0.15 |
| 27 | 2-amino-4-(3-chlorophenyl)-2-imidazoline hydrobromide | 0.03 |
| 56 | 2-amino-4-[3,4-dimethoxyphenyl]-2-imidazoline hydrobromide | 0.003 |
| 58 | 2-amino-4-(3,4-dihydroxyphenyl)-2-imidazoline hydrobromide | <0.03 |
| 59 | 2-benzylamino-4-phenyl-2-imidazoline fumarate | 0.15 |
| 60 | 2-(4-chlorobenzylamino)-4-phenyl-2-imidazoline fumarate | <0.3 |
| 61 | 2-(3-dimethylaminopropylamino)-4-phenyl-2-imidazoline dihydrochloride | <0.003 |
| 62 | 2-(2,6-dichlorobenzylidenehydrazino)-4-(2-chlorophenyl)-2-imidazoline hydriodide | <0.03 |
| 63 | 4-(4-chlorophenyl)-2-(methylamino)-2-imidazoline hemimucate | 0.075 |
| 64 | 4-(4-chlorophenyl)-2-hydrazino-2-imidazoline hydrochloride | 10.0 |

[a]Preparation infra.

The neuronal blocking activity of the subject imidazolines is generally tenfold or more superior to that of 2-amino-4-phenyl-2-imidazoline hydrobromide, a known compound of analogous structure. The latter exhibits only 0.03 times the activity of guanethidine in this test.

Compounds of the instant invention which are particularly preferred for their strong neuronal blocking action are 2-amino-4-R-phenyl-2-imidazolines wherein R is as defined above and the corresponding 2-hydrazino and 2-alkylidenehydrazino imidazolines. There can be mentioned as particularly valuable embodiments of the present invention, the following compounds:

2-amino-4-(2-chlorophenyl)-2-imidazoline and its hydrobromide;

levorotatory 2-amino-4(2-chlorophenyl)-2-imidazoline and its hydrobromide;

dextrorotatory 2-amino-4-(2-chlorophenyl)-2-imidazoline and its hydrobromide;

2-amino-4-(4-chlorophenyl)-2-imidazoline and its hydrobromide;

2-amino-4-(4-bromophenyl)-2-imidazoline and its hydrobromide;

2-amino-4-(para-tolyl)-2-imidazoline and its hydrobromide;

2-amino-4-(2,4-dichlorophenyl)-2-imidazoline and its hydrobromide;

2-amino-4-(4-biphenyl)-2-imidazoline and its hydrobromide;

2-amino-4-(2,6-dichlorophenyl)-2-imidazoline and its hydrobromide;

2-amino-4-(3,4-dichlorophenyl)-2-imidazoline and its hydrobromide;

2-amino-4-(4-methoxyphenyl)-2-imidazoline and its hydrobromide;

4-(2-chlorophenyl)-2-hydrazino-2-imidazoline and its hydriodide;

4-(2-chlorophenyl)-2-isopropylidenehydrazino-2-imidazoline and its hydriodide;

4-(2-chlorophenyl)-2-hydroxyamino-2-imidazoline and its hydrochloride.

The antihypertensive effects of the imidazolines of the present invention can be demonstrated in hypertensive rats. Hypertension is produced in Sprague Dawley male rats, weighing 90–100 grams each, by subcutaneous administration of desoxycorticosterone acetate (DOCA) at a dose of 10 mg./rat/day for five days each week for three weeks. One percent saline is provided ad libitum for the three-week period. At the end of the treatment period tap water is substituted for the 1 percent saline. Systolic blood pressures are determined by the tail cuff method, utilizing capacitance transducers for the detection of pressure, an aneroid manometer for measuring pressure, and an oscilloscope for visualizing the disappearance and/or appearance of the pressure pulse. Groups of five rats each having a systolic blood pressure of 170 mmHg or greater are selected and the test compound administered at a dose of 5 mg.-/kg. subcutaneously in sterile water at a constant volume of 2.5 ml./kg. One group serves as a control and receives the water vehicle, while another receives an antihypertensive reference agent such as guanethidine sulfate, (subcutaneous dose of 20 mg./kg.) The test groups received the test agent or vehicle at 0 and 24 hr. Blood pressure and heart rate measurements are made at 0 time (immediately prior to the first dose), 4.24 (immediately prior to the second dose) 28, and 48 hr.

Data provided by this test includes absolute systolic blood pressures in mmHg and heart rates in beats per minute, changes in pressure and rate versus the respective time values, and percent changes in pressure and rate. By plotting the percent decrease in blood pressure as a function of time and determining the area under the resulting curve, an overall index of antihypertensive activity can be obtained.

The test agent is rated "very active" if either the actual blood pressure or percent decrease in pressure differed significantly (as measured by conventional statistical analysis) at all post treatment intervals. They are rated "active" when there is a significant difference in either the actual pressures or percent decreases in pressure at either (a) 4 and 28 hr. or (b) 24 and 48 hr. posttreatment. Test agents showing at least one random significant difference are rated "slightly active" and those exhibiting no significant difference are classified as "inactive." On the basis of area under the percent decrease in pressure-time curve, compounds were considered very active when the area exceeded 600 units, active between 300 and 600 units, slightly active from 100 to 300 units, and inactive below 100 units.

In Table II, results obtained with representative imidazolines of the present invention are reported. The last column is a composite rating for the test agent calculated from the first three columns by (a) arbitrarily assigning numeric values of 3 (very active), 2 (active), 1 (slightly active), and 0 (inactive) for each rating, (b) summing the assigned numeric values for actual blood pressure, percent decrease in blood pressure, and area under the time curve; and (c) applying the following ratings to those totals: very active, 8–9 (9 equals maximum score); active (4–7); slightly active (2–3); and inactive (0–1). It is to be understood that these ratings are derived from a one dose level (5 mg./kg. body weight) assay and consequently are considered only semi-quantitative and that increasing the dosage, according to accepted pharmaceutical practice, of test agents classified herein as "inactive" or "slightly active" could produce an increased antihypertensive effect.

TABLE II

ANTIHYPERTENSIVE ACTIVITY RATING[a]

| Example[b] | Chemical Name | Activity Based On | | | Total | Composite Rating |
|---|---|---|---|---|---|---|
| | | Actual B.P. Decrease | % Decrease in B.P. | Area Under % Decrease Time Curve | | |
| 1 | 2-amino-4-(2-chlorophenyl)-2-imidazoline hydrobromide levorotatory | I | I | SA (188 ± 132) | 1 | I |
| 1 | 2-amino-4-(2-chlorophenyl)-2-imidazoline hydrobromide dextrorotatory | SA | A | A (420 ± 23) | 5 | A |
| 2 | 2-benzylamino-4-(2-chlorophenyl)-2-imidazoline hydriodide | I | SA | I (52 ± 45) | 1 | I |
| 3 | 4-(2-chlorophenyl)-2-hydrazino-2-imidazoline hydriodide | SA | SA | A (387 ± 125) | 4 | A |
| 4 | 4-(2-chlorophenyl)-2-hydroxyamino-2-imidazoline hydrochloride | SA | SA | SA (167 ± 46) | 3 | SA |
| 5 | 4-(2-chlorophenyl)-2-isopropylidenehydrazino-2-imidazoline hydriodide | A | A | A (484 ± 123) | 6 | A |
| 6 | 2-amino-4-(4-chlorophenyl)-2-imidazoline hydrobromide | SA | SA | A (413 ± 135) | 4 | A |
| 7 | 2-amino-4-(4-bromophenyl)-2-imidazoline hydrobromide | A | A | A (484 ± 111) | 6 | A |
| 8 | 2-amino-4-(2,4-dichlorophenyl)-2-imidazoline hydrobromide | A | A | A (508 ± 87) | 6 | A |
| 9 | 2-amino-4-(2,6-dichlorophenyl)-2-imidazoline hydrobromide | SA | A | VA (657 ± 92) | 6 | A |
| 10 | 2-amino-4-(3,4-dichlorophenyl)-2-imidazoline hydrobromide | VA | VA | VA (1211 ± 84) | 9 | VA |
| 11 | 2-amino-4-(m-tolyl)-2-imidazoline hydrobromide | SA | A | A (379 ± 129) | 5 | A |
| 12 | 2-amino-4-(p-tolyl)-2-imidazoline hydrobromide | A | A | A (425 ± 34) | 6 | A |
| 13 | 2-amino-4-(4-methoxyphenyl)-2-imidazoline hydrobromide | SA | SA | SA (220 ± 62) | 3 | SA |
| 14 | 2-amino-4-[4-benzyloxyphenyl]-2-imidazoline hydrobromide | I | I | I (39 ± 78) | 0 | I |
| 15 | 2-amino-4-(4-biphenylyl)-2-imidazoline hydrobromide | A | A | A (415 ± 49) | 6 | A |
| 16 | 2-amino-1-benzyl-5-(2-chlorophenyl)-2-imidazoline hydrobromide | I (35 ± 66) | I | I | 0 | I |
| 17 | 2-amino-4-(4-fluorophenyl)-2-imidazoline hydrobromide | I | I | I (−8 ± 66) | 0 | I |
| 27 | 2-amino-4-(3-chlorophenyl)-2-imidazoline hydrobromide | SA | SA | SA (** ± 56) | 3 | SA |
| 33 | 2-amino-4-[4-(trifluoromethyl)phenyl] 2-imidazoline hydrobromide | SA (297 ± 52) | SA | SA | 3 | SA |
| 54 | 2-amino-4-(3-methoxyphenyl)-2-imidazoline hydrobromide | SA | I | SA (178 ± 121) | 2 | SA |
| 55 | 2-amino-4-[3-(benzyloxy)phenyl]-2-imidazoline hydrobromide | A | A | A (391 ± 58) | 6 | A |
| 56 | 2-amino-4-[3,4-dimethoxyphenyl]-2-imidazoline hydrobromide | SA | A | A (394 ± 69) | 5 | A |
| 57 | 2-amino-4-(3-hydroxyphenyl)-2-imidazoline hydrobromide | SA | A | A (505 ± 96) | 5 | A |
| 58 | 2-amino-4-(3,4-dihydroxyphenyl)-2-imidazoline hydrobromide | A | SA | VA (619 ± 96) | 6 | A |

TABLE II – Continued

ANTIHYPERTENSIVE ACTIVITY RATING[a]

| Example[b] | Chemical Name | Activity Based On | | | Total | Composite Rating |
|---|---|---|---|---|---|---|
| | | Actual B.P. Decrease | % Decrease in B.P. | Area Under % Decrease Time Curve | | |
| 59 | 2-benzylamino-4-phenyl-2-imidazoline fumarate | SA | SA | A (325 ± 82) | 4 | A |
| 60 | 2-(4-chlorobenzylamino)-4-phenyl-2-imidazoline fumarate | A | A | VA (612 ± 71) | 7 | A |
| 61 | 2-(3-dimethylaminopropylamino)-4-phenyl-2-imidazoline dihydrochloride | SA | SA | SA (268 ± 119) | 3 | SA |
| 62 | 2-(2,6-dichlorobenzylidenehydrazino)-4-(2-chlorophenyl)-2-imidazoline hydriodide | A (450 ± 66) | A | A | 6 | A |
| 63 | 4-(4-chlorophenyl)-2-(methylamino)-2-imidazoline hemimucate | VA (522 ± 107) | A | A | 7 | A |
| 64 | 4-(4-chlorophenyl)-2-hydrazino-2-imidazoline hydrochloride | A | SA | A (336 ± 68) | 5 | A |

| [a] Rating | Abbreviation | Numerical Value |
|---|---|---|
| Very Active | VA | 3 |
| Active | A | 2 |
| Slightly Active | SA | 1 |
| Inactive | I | 0 |

[b] Preparation infra.

Compounds of the present invention particularly preferred for their potent antihypertensive effects are:

2-amino-4-(4-chlorophenyl)-2-imidazoline and its hydrobromide, 2-amino-4-(3,4-dichlorophenyl)-2-imidazoline and its hydrobromide, 4-(2-chlorophenyl)-2-isopropylidene hydrazino-2-imidazoline and its hydriodide, 2-amino-4-(2,6-dichlorophenyl)-2-imidazoline and its hydrobromide, 2-amino-4-[3,4-dimethoxyphenyl]-2-imidazoline and its hydrobromide, 4-(4-chlorophenyl)-2-(methylamino)-2-imidazoline and its hemimucate, 2-(4-chlorobenzylamino)-4-phenyl-2-imidazoline and its fumarate.

The known art imidazoline, 2-amino-4-phenyl-2-imidazoline at a 5 mg./kg. body weight subcutaneous dose has no demonstrable activity in the DOCA hypertensive rat model and is considered to be essentially inactive.

The antihypertensive and neuronal blocking therapeutic process of the present invention is carried out in mammals by systemic administration of a non-toxic effective dose of the imidazolines of the present invention ranging from about 0.01 to 50 milligram per kilogram of body weight of the mammal. By systemic administration it is intended to include both oral and parenteral routes. Examples of parenteral administration are intramuscular, intravenous, intraperitoneal and subcutaneous administration. The dosage will vary with the form of administration and particular compound chosen. Generally, the compound is administered at a dosage substantially less than the dose of the compound which is thought to be effective. Thereafter, the dosage is increased by small increments until the optimum effect under the circumstances is reached. As a general rule, it will be found that when the composition is administered orally, larger quantities of the imidazoline will be required to produce the same effect as the smaller quantity given parenterally. In general, the compounds of this invention are most desirably administered at a concentration level that will afford effective results without causing any harmful or deleterious side effects.

The compounds which constitute this invention and their methods of preparation will appear more fully from a consideration of the following examples which are given for the purpose of illustration only and are not to be construed as limiting the invention in spirit or in scope.

EXAMPLE 1

2-Amino-4-(2-chlorophenyl)-2-imidazoline hydrobromide.

An aqueous solution of 1-(2-chlorophenyl)ethylenediamine dihydrochloride (8.8 g., 0.04 mole) is made basic with 50 percent sodium hydroxide and the free base isolated by extracting the basified solution with chloroform, drying the chloroform extract over potassium carbonate and concentrating under reduced pressure. The free base thus obtained is taken up in 100 ml. of benzene and treated with a solution of cyanogen bromide (4.2 g., 0.04 mole) in 50 ml. of benzene. After stirring for 4 hrs. at room temperature, the mixture is filtered and the filter-cake washed with benzene to provide 9.1 g., (92 percent yield) of 2-amino-4-(2-chlorophenyl)-2-imidazoline hydrobromide having a melting point of 190°–200°C. Crystallization of this material from absolute ethanol-isopropyl ether affords 7.0 g. of analytically pure product, m.p. 213.5°–215.5°C. (corr.).

Analysis. Calcd. for $C_9H_{10}ClN_3 \cdot HBr$ (percent): C, 39.08; H, 4.01; N, 15.19. Found (percent): C, 38.92; H, 4.08; N, 15.07.

Reaction of d-1-(2-chlorophenyl)ethylenediamine obtained from d-1-(2-chlorophenyl)ethylenediamine *l*-tartrate (5.0 g., 0.0155 mole) with 1.8 g. of cyanogen bromide in 50 ml. of benzene according to the above procedure and crystallization of the imidazoline obtained from absolute ethanol-isopropyl ether provides analytically pure *l*-2-amino-4-(2-chlorophenyl)-2-imidazoline hydrobromide, m.p. 160°–162.5°C. (corr.); $[\alpha]_D^{25}$ −94.8° (c = 1, H$_2$O).

Analysis. Calcd. for C$_9$H$_{10}$ClN$_3$·HBr (percent): C, 39.08; H, 4.01; N, 15.19. Found (percent): C, 38.91; H, 4.11; N, 14.92.

Reaction of *l*-1-(2-chlorophenyl)ethylenediamine obtained from *l*-1-(2-chlorophenyl)ethylenediamine di-d-camphor sulfonate (5.0 g., 0.008 mole) with 1.0 g. of cyanogen bromide in 25 ml. of benzene according to the above procedure and crystallization of the imidazoline thus obtained from absolute ethanol-isopropyl ether provides analytically pure d-2-amino-4-(2-chlorophenyl)-2-imidazoline hydrobromide, m.p. 162°–163°C. (corr.); $[\alpha]_D^{25}$ = +94.4° (C = 1, H$_2$O).

Analysis. Calcd. for C$_9$H$_{10}$ClN$_3$·HBr (percent): C, 39.08; H, 4.01; N, 15.19. Found (percent): C, 38.80; H, 4.08; N, 14.93.

EXAMPLE 2

2-Benzylamino-4-(2-chlorophenyl)-2-imidazoline hydriodide.

A mixture of 2-methylthio-4-(2-chlorophenyl)-2-imidazoline hydriodide (7.1 g., 0.02 mole) and benzylamine (2.14 g., 0.02 mole) in 75 ml. of isopropanol is refluxed for 44 hr. At this point, an additional equivalent of benzylamine is added, reflux continued for another 6 hrs. and the mixture then concentrated under reduced pressure. The residual oil shaken with 1:1 mixture of water-ether solidifies on standing, and is collected, triturated with ether and dried to provide 5.3 g. of product having a melting point of 130°–135°C. Crystallization of this material from absolute ethanol-isopropyl ether affords analytically pure 2-benzylamino-4-(2-chlorophenyl)-2-imidazoline hydriodide, m.p. 147°–149°C. (corr.).

Analysis. Calcd. for C$_{16}$H$_{16}$ClN$_3$·HI (percent): C, 46.45; H, 4.14; N, 10.15. Found (percent): C, 46.18; H, 4.21; N, 9.98.

EXAMPLE 3

4-(2-Chlorophenyl)-2-hydrazino-2-imidazoline hydriodide.

Hydrazine hydrate (85%, 39 g., 0.05 mole) is added in one portion to 2-methylthio-4-(2-chlorophenyl)-2-imidazoline hydriodide (17.7 g., 0.05 mole) in 200 ml. of absolute ethanol. The mixture is refluxed for a 6 hr. period and then concentrated in vacuo to provide a residual oil which is successively taken up in absolute ethanol and reconcentrated until a solid is obtained. Trituration of the solid with absolute ethanol provides 13.2 g. (78% yield) of material having a melting point of 175°–182°C., crystallization from isopropyl alcohol-isopropyl ether provides analytically pure 4-(2-chlorophenyl)-2-hydrazino-2-imidazoline hydriodide.

Analysis. Calcd. for C$_9$H$_{11}$ClN$_4$·HI (percent): C, 31.92; H, 3.57; N, 16.55. Found (percent): C, 31.93; H, 3.58; N, 16.74.

EXAMPLE 4

4-(2-Chlorophenyl)-2-hydroxyamino-2-imidazoline hydrochloride

To 2-methylthio-4-(2-chlorophenyl)-2-imidazoline hydriodide (7.09 g., 0.02 mole) in 25 ml. of methanol is added a solution of methanolic sodium methoxide prepared by the addition of sodium (0.46 g., 0.02 mole) to 25 ml. of methanol. The mixture is concentrated under reduced pressure and the residue taken up in anhydrous ether, filtered, and the filtrate concentrated in vacuo. The resulting oily residue solidifies on scratching and is triturated with ether to provide 4.1 g. of 2-methylthio-4-(2-chlorophenyl)-2-imidazoline, m.p. 78°–80°C.

Reaction of 2-methylthio-4-(2-chlorophenyl)-2-imidazoline (4 g., 0.018 mole) with hydroxylamine hydrochloride (1.39 g., 0.02 mole) in 50 ml. of absolute ethanol according to the procedure of Example 2 provides 4-(2-chlorophenyl)-2-hydroxyamino-2-imidazoline hydrochloride. An analytical sample obtained by crystallization from acetonitrile-methanol has a melting point of 175.5°–177.5°C. (corr.).

Analysis. Calcd. for C$_9$H$_{10}$ClN$_3$O·HCl (percent): C, 43.56; H, 4.47; N, 16.94. Found (percent): C, 43.50; H, 4.64; N, 16.88.

EXAMPLE 5

4-(2-Chlorophenyl)-2-isopropylidene hydrazino-2-imidazoline hydriodide.

To a hot solution of 4-(2-chlorophenyl)-2-hydrazino-2-imidazoline hydriodide (3.38 g., 0.01 mole) in 30 ml. of water is added 1 ml. of acetone and two drops of acetic acid. The mixture is refluxed for 0.5 hr., cooled, and filtered to provide 2.9 g. of analytically pure 4-(2-chlorophenyl)-2-isopropylidene hydrazino-2-imidazoline hydriodide, m.p. 205.5°–207.5°C. (corr.).

Analysis. Calcd. for C$_{12}$H$_{15}$ClN$_4$·HI (percent): C, 38.06; H, 4.26; N, 14.80. Found (percent): C, 38.15; H, 4.43; N, 14.96.

EXAMPLES 6–16

Other representative examples of the compounds of the present invention prepared according to the procedure described in Example 1 from the indicated phenylethylenediamine reactants are enumerated in the following table.

TABLE III.—IMIDAZOLINES

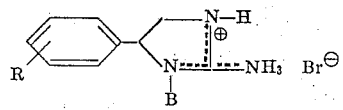

| Example No. | Phenylethylenediamine reactant | R | B | M.P., °C. | Formula | Calcd. C | Calcd. H | Calcd. N | Found C | Found H | Found N |
|---|---|---|---|---|---|---|---|---|---|---|---|
| 6 | 1-(4-chlorophenyl)-ethylenediamine | 4-Cl | H | 241-242 | $C_9H_{10}ClN_3 \cdot HBr$ | 39.08 | 4.01 | 15.19 | 38.87 | 4.22 | 15.02 |
| 7 | 1-(4-bromophenyl)-ethylenediamine | 4-Br | H | 239-240.5 | $C_9H_{10}BrN_3 \cdot HBr$ | 33.67 | 3.45 | 13.09 | 33.76 | 3.46 | 13.20 |
| 8 | 1-(2,4-dichlorophenyl)-ethylenediamine | 2,4-diCl | H | 198.5-200.5 | $C_9H_9Cl_2N_3 \cdot HBr$ | 34.75 | 3.24 | 13.51 | 35.00 | 3.08 | 13.50 |
| 9 | 1-(2,6-dichlorophenyl)-ethylenediamine | 2,6-diCl | H | 233-235 | $C_9H_9Cl_2N_3 \cdot HBr$ | 34.75 | 3.24 | 13.51 | 34.97 | 3.17 | 13.61 |
| 10 | 1-(3,4-dichlorophenyl)-ethylenediamine | 3,4-diCl | H | 213-215 | $C_9H_9Cl_2N_3 \cdot HBr$ | 34.75 | 3.24 | 13.51 | 35.02 | 3.22 | 13.27 |
| 11 | 1-(3-methylphenyl)-ethylenediamine | 3-$CH_3$ | H | 148-149 | $C_{10}H_{13}N_3 \cdot HBr$ | 46.89 | 5.51 | 16.40 | 47.04 | 5.56 | 16.33 |
| 12 | 1-(4-methylphenyl)-ethylenediamine | 4-$CH_3$ | H | 185-187.5 | $C_{10}H_{13}N_3 \cdot HBr$ | 46.89 | 5.51 | 16.40 | 46.63 | 5.31 | 16.14 |
| 13 | 1-(4-methoxyphenyl)-ethylenediamine | 4-$CH_3O$ | H | 210.5-211 | $C_{10}H_{13}N_3O \cdot HBr$ | 44.13 | 5.18 | 15.44 | 44.35 | 5.32 | 15.32 |
| 14 | 1-(4-benzyloxyphenyl)-ethylenediamine | 4-$C_6H_5O$ | H | 219.5-224.5 | $C_{16}H_{17}N_3O \cdot HBr$ | 55.18 | 5.21 | 12.07 | 55.22 | 5.10 | 11.83 |
| 15 | 1-(biphenyl)ethylenediamine | 4-$C_6H_5$ | H | 256-258 | $C_{15}H_{15}N_3 \cdot HBr$ | 56.61 | 5.07 | 13.20 | 56.31 | 5.04 | 13.20 |
| 16 | β-Benzylamino-2-chlorophenethylamine | 2-Cl | $C_6H_5CH_2$ | 221.5-223.5 | $C_{16}H_{16}ClN_3 \cdot HBr$ | 52.40 | 4.67 | 11.46 | 52.67 | 4.65 | 11.49 |

EXAMPLES 17-53

Further exemplification of the imidazolines of the present invention is listed below in Table IV. The imidazolines are prepared by cyclization of the appropriately substituted phenylethylenediamine with cyanogen bromide according to the procedure described in Example 1. or by displacement of methyl mercaptan from 4-substituted-2-methylthio-2-imidazoline according to the procedures described in Examples 2-4. The phenylethylenediamines and the 4-substituted-2-methylthio-2-imidazolines intermediates are obtained utilizing substituted benzaldehydes according to methods described more fully below.

TABLE IV.—ADDITIONAL IMIDAZOLINES

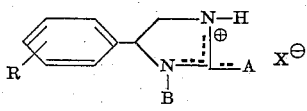

| Ex. No. | R | B | A | X |
|---|---|---|---|---|
| 17[a] | 4-F | H | $NH_2$ | Br |
| 18 | 4-Cl | H | $NHCH_3$ | Br |
| 19 | 4-Cl | H | $NHCH(CH_3)_2$ | Br |
| 20 | 4-Cl | H | $NH$-$n$-$C_4H_9$ | Br |
| 21 | 4-Cl | H | $NHCH_2C_6H_5$ | I |
| 22 | 4-Cl | H | $NHOH$ | Cl |
| 23 | 4-Cl | H | $NHNH_2$ | I |
| 24 | 4-Cl | H | $NHN=CHCH_3$ | I |
| 25 | 4-Cl | H | $NHN=C(CH_3)_2$ | I |
| 26 | 4-Cl | H | $NHN=C$-$n$-$C_4H_9$ $\vert$ $CH_3$ | I |
| 27[b] | 3-Cl | H | $NH_2$ | Br |
| 28 | 4-Cl | $CH_3$ | $NH_2$ | Br |
| 29 | 4-Cl | $CH_3$ | $NHNH_2$ | I |
| 30 | 4-Cl | $CH(CH_3)_2$ | $NH_2$ | Br |
| 31 | 4-Cl | $CH_2C_6H_5$ | $NH_2$ | Br |
| 32 | 4-Cl | $CH_2C_6H_5$ | $NHNH_2$ | Br |
| 33[c] | 4-$F_3C$ | H | $NH_2$ | Br |
| 34 | 2-$C_2H_5$ | H | $NH_2$ | Br |
| 35 | 4-$n$-$C_4H_9$ | H | $NH_2$ | Br |
| 36 | 4-$(CH_3)_2CH$ | H | $NH_2$ | Br |
| 37 | 4-$n$-$C_4H_9O$ | H | $NH_2$ | Br |
| 38 | 4-$n$-$C_2H_9O$ | H | $NHNH_2$ | I |
| 39 | 4-Cl—⟨phenyl⟩ | H | $NH_2$ | Br |
| 40 | Same as above | H | $NHNH_2$ | I |
| 41 | 4-Br—⟨phenyl⟩ | H | $NH_2$ | Br |
| 42 | 4-$CH_3$—⟨phenyl⟩ | H | $NH_2$ | Br |
| 43 | 4-$n$-$C_4H_9$—⟨phenyl⟩ | H | $NH_2$ | Br |
| 44 | 4-⟨phenyl⟩ | H | $NHNH_2$ | I |
| 45 | 2,6-di $CH_3$ | H | $NH_2$ | Br |
| 46 | 3,5-di $CH_3$ | H | $NH_2$ | Br |
| 47 | 2-$CH_3$,4-Cl | H | $NH_2$ | Br |
| 48 | 2,4,6-tri Cl | H | $NH_2$ | Br |
| 49 | 3,4,5-tri Cl | H | $NH_2$ | Br |
| 50 | 2,3,6-tri $CH_3$ | H | $NH_2$ | Br |
| 51 | 2,4,5-tri $CH_3$ | H | $NHNH_2$ | I |
| 52 | 2,4,6-tri $C_2H_5$ | H | $NH_2$ | Br |
| 53 | 3-$CH_3$-4,6-di Cl | H | $NH_2$ | Br |

[a] Example No. 17: M.P. 199.0-200.5° C. (corr.). Calcd. for $C_9H_{10}FN_3 \cdot HBr$ (percent): C, 41.55; H, 4.26; N, 16.15. Found (percent): C, 41.62; H, 4.28; N, 16.08.

[b] Example No. 27: M.P. 168.5-170.5° C. (corr.). Calcd. for $C_9H_{10}ClN_3 \cdot HBr$ (percent): C, 39.08, H, 4.01; N. 15.19. Found (percent): C, 39.36; H, 3.93; N, 15.02.

[c] Example No. 33: M.P. 135.5-137.5° C. (corr.). Calcd. for $C_{10}H_{10}F_3N_3 \cdot HBr$ (percent): C, 38.72; H, 3.58; N, 13.55. Found (percent): C, 38.91; H, 3.66; N, 13.66.

a. Example No. 17: m.p. 199.0°-200.5°C. (corr.). Calcd. for $C_9H_{10}FN_3 \cdot HBr$ (percent): C, 41.55; H, 4.26; N, 16.15. Found (percent): C, 41.62; H, 4.28; N, 16.08.

b. Example No. 27: m.p. 168.5°-170.5°C. (corr.). Calcd. for $C_9H_{10}ClN_3 \cdot HBr$ (percent): C, 39.08; H, 4.01; N, 15.19. Found (percent): C, 39.36; H, 3.93; N, 15.02.

c. Example No. 33: m.p. 135.5°-137.5°C. (corr.). Calcd. for $C_{10}H_{10}F_3N_3 \cdot HBr$ (percent): C, 38.72; H, 3.58; N, 13.55. Found (percent): C, 38.91; H, 3.66; N, 13.66.

EXAMPLE 54

2-Amino-4-(3-methoxyphenyl)-2-imidazoline hydrobromide

Cyclization of 1-(3-methoxyphenyl)ethylenediamine with cyanogen bromide is carried out according to the procedure of Example 1. The analytically pure product (from acetonitrile-isopropyl ether) has a melting point of 150.0°-151.5°C. (corr.).

Analysis. Calcd. for $C_{10}H_{13}N_3 \cdot HBr$ (percent): C, 44.14; H, 5.18; N, 15.44. Found (percent): C, 44.50; H, 5.22; N, 15.10.

EXAMPLE 55

2-Amino-4-[3-(benzyloxy)phenyl]-2-imidazoline hydrobromide

Cyclization of 1-(3-benzyloxyphenyl)-ethylenediamine is carried out according to the procedure of Example 1. The analytically pure product (from ethyl acetate) has a melting point of 178.5°–180.5°C. (corr.).

Analysis. Calcd. for $C_{16}H_{17}N_3 \cdot HBr$ (percent): C, 55.18; H, 5.21; N, 12.07. Found (percent): C, 55.45; H, 5.12; N, 12.06.

EXAMPLE 56

2-Amino-4-[3,4-dimethoxyphenyl]-2-imidazoline hydrobromide

Cyclization of 1-(3,4-dimethoxyphenyl)-ethylenediamine is carried out according to the procedure of Example 1. The analytically pure product (from acetone isopropyl ether) has a melting point of 158.5°–159.5°C. (corr.).

Analysis. Calcd. for $C_{11}H_{15}N_3 \cdot HBr$ (percent): C, 43.72; H, 5.34; N, 13.90. Found (percent): C, 43.73; H, 5.26; N, 13.91.

EXAMPLE 57

2-Amino-4-(3-hydroxyphenyl)-2-imidazoline hydrobromide

2-Amino-4-[3-(benzyloxy)phenyl]-2-imidazoline hydrobromide is debenzylated in a Parr apparatus employing 10 percent palladium on carbon catalyst in ethanol. The analytically pure product (from acetonitrile) has a melting point of 119.5°–122.5°C. (corr.).

Analysis. Calcd. for $C_9H_{11}N_3O \cdot HBr$ (percent): C, 41.87; H, 4.69; N, 16.28. Found (percent): C, 41.62; H, 4.76; N, 15.99.

EXAMPLE 58

2-Amino-4-(3,4-dihydroxyphenyl)-2-imidazoline hydrobromide

Cyclization of 1-(3,4-dibenzyl-oxyphenyl)ethylenediamine with cyanogen bromide carried out according to the procedure of Example 1 provides 2-amino-4-[3,4-dibenzyloxyphenyl]-2-imidazoline hydrobromide. The dibenzyloxy imidazoline is debenzylated in methanol employing 10% palladium on carbon catalyst. The analytically pure product (from methanol-acetonitrile) has a melting point of 167.5°–169.5°C. (corr):

Analysis. Calcd. for $C_9H_{11}N_3O_2 \cdot HBr$ (percent): C, 39.43; H, 4.41; N, 15.33. Found (percent): C, 39.45; H, 4.27; N, 15.23.

EXAMPLE 59

2-Benzylamino-4-phenyl-2-imidazoline-fumarate.

A mixture of 2-methylthio-4-phenyl-2-imidazoline hydriodide (8.0 g., 0.025 mole) and benzylamine (2.68 g., 0.025 mole) in 100 ml. of isopropanol is refluxed for two days and the mixture concentrated. The residual oil is stirred with 200 ml. of hot water, water insoluble material separated, and the aqueous solution made basic with sodium hydroxide, extracted with chloroform, and the chloroform extract dried over potassium carbonate. Concentration of the dried chloroform extract provides an oil which is taken up in absolute ethanol and acidified with fumaric acid. Addition of isopropyl ether to the acidified solution provides the imidazoline product 4.5 g., m.p. 203°–205°C. Crystallization from methanol-ethanol provides analytically pure 2-benzylamino-4-phenyl-2-imidazoline fumarate, m.p. 203°–204°C. (corr.).

Analysis. Calcd. for $C_{16}H_{17}N_3 \cdot \frac{1}{2} C_4H_4O_4$ (percent): C, 69.88; H, 6.19; N, 13.58. Found (percent): C, 70.03; H, 6.27; N, 13.63.

EXAMPLE 60

2-(4-Chlorobenzylamino)-4-phenyl-2-imidazoline fumarate.

Reaction of 2-methylthio-4-phenyl-2-imidazoline hydriodide with 4-chlorobenzylamine is carried out according to the procedure of Example 59. The analytically pure product (from acetone) has a melting point of 180.5°–182.5°C. (dec.) (corr.).

Analysis. Calcd. for $C_{16}H_{16}ClN_3 \cdot \frac{1}{2} C_4H_4O_4$ (percent): C, 62.88; H, 5.28; N, 12.22. Found (percent): C, 63.08; H, 5.50; N, 12.22.

EXAMPLE 61

2-(3-Dimethylaminopropylamino)-4-phenyl-2-imidazoline dihydrochloride

Reaction of 2-methylthio-4-phenyl-2-imidazoline hydriodide with dimethylaminopropylamine in absolute ethanol is carried out according to the procedure of Example 59. The analytically pure product (from isopropyl ether absolute ethanol) has a melting point of 208°–210°C. (corr.).

Analysis. Calcd. for $C_{14}H_{22}N_4 \cdot 2HCl$ (percent): C, 52.66; H, 7.58; N, 17.55. Found (percent): C, 52.60; H, 7.58; N, 17.36.

EXAMPLE 62

2-(2,6-Dichlorobenzylidenehydrazino)-4-(2-chlorophenyl)-2-imidazoline hydriodide.

An equimolar mixture of 4-(2-chlorophenyl)-2-hydrazine-2-imidazoline hydriodide and 2,6-dichlorobenzaldehyde in 50 ml. of absolute ethanol with a catalytic amount of acetic acid is refluxed for 18 hr. and then concentrated under reduced pressure. Trituration of the residue thus obtained with ethanol provides the imidazoline product which is crystallized from acetonitrile-isopropyl ether to analytical purity, m.p. 209.5°–210.5°C. (corr.).

Analysis. Calcd. for $C_{16}H_{13}Cl_3N_4 \cdot HI$ (percent): C, 38.77; H, 2.85; N, 11.30. Found (percent): C, 38.50; H, 2.79; N, 11.46.

EXAMPLE 63

4-(4-Chlorophenyl)-2-(methylamino)-2-imidazoline hemimucate.

A mixture of 2-methylthio-4-(4-chlorophenyl)-2-imidazoline (5.65 g., 0.025 mole) and methylamine hydrochloride (1.75 g., 0.025 mole) in 100 ml. of isopropanol is refluxed for 15 hr. and then concentrated under reduced pressure. The residual oil is taken up in water, converted to the free base with sodium hydroxide and extracted with chloroform. After drying the chloroform extract over potassium carbonate, the chloroform solvent is removed and the residue taken up in refluxing methanol. Mucic acid (2.6 g.) is added to the hot solution and the mixture filtered. Concentration of the filtrate and trituration of residue with hot acetone provides a solid which is crystallized from methanol-isopropyl ether to provide analytically pure product, m.p. 179.5°–180.5°C. (dec.) (corr.).

Analysis. Calcd. for $C_{10}H_{12}ClN_3 \cdot \frac{1}{2} \, C_6H_{10}O_8$ (percent): C, 49.60; H, 5.44; N, 13.35. Found (percent): C, 49.35; H, 5.53; N, 13.26.

EXAMPLE 64

4-(4-Chlorophenyl)-2-hydrazino-2-imidazoline hydrochloride.

2-Methylthio-4-(4-chlorophenyl)-2-imidazoline hydriodide (8.9 g., 0.025 mole) and 2 g. of 85% hydrazine hydrate in 75 ml. of isopropyl alcohol is refluxed for about 6 hr. and then concentrated under reduced pressure. Trituration of the residue with ethyl acetate provides 4-(4-chlorophenyl)-2-hydrazino-2-imidazoline hydriodide, m.p. 125°–127°C. The imidazoline hydriodide is passed through an ion exchange column to convert it to the hydrochloride salt. The hydrochloride salt crystallized from ethyl acetate-methanol provides analytically pure 4-(4-chlorophenyl)-2-hydrazino-2-imidazoline hydrochloride, m.p. 155.5°–157.5°C. (corr.).

Analysis. Calcd. for $C_9H_{11}ClN_4 \cdot HCl$ (percent): C, 43.74; H, 4.90; N, 22.67. Found (percent): C, 43.51; H, 5.09; N, 22.56.

EXAMPLE 65

4-(4-Chlorophenyl)-2-(benzylamino)-2-imidazoline hydriodide.

Reaction of 2-methylthio-4-(4-chlorophenyl)-2-imidazoline hydriodide and benzylamine according to the procedure of Example 59 and preparation of the hydriodide salt according to Example 63 affords 4-(4-chlorophenyl)-2-(benzylamino)-2-imidazoline hydriodide, m.p. 118.5°–120.5°C. (corr.) (from isopropanol-isopropyl ether).

Analysis. Calcd. for $C_{16}H_{17}ClN_3 \cdot HI$ (percent). C, 46.45; H, 4.14; N, 10.16. Found (percent): C, 46.23; H, 4.23; N, 10.08.

EXAMPLE 66

4-(4-Chlorophenyl)-2-(4-chlorobenzylamino-2-imidazoline hydriodide.

Reaction of 2-methylthio-4-(4-chlorophenyl)-2-imidazoline hydriodide and 4-chlorobenzylamine according to the method of Example 59 provides the imidazoline, 4-(4-chlorophenyl)-2-(4-chlorobenzylamino)-2-imidazoline hemimucate m.p. 126°–128°C. (from acetonitrile). Neutralizing the imidazoline hemimucate with base and acidifying the base in an inert solvent with HI provides:

4-(4-chlorophenyl)-2-(4-chlorobenzylamino-2-imidazoline hydriodide, m.p. 152°–154°C. (from acetonitrile-isopropyl ether).

EXAMPLE 67

4-(3,4-Dichlorophenyl)-2-(3,4-dichlorobenzylamino)-2-imidazoline hydriodide.

Reaction of 2-methylthio-4-(3,4-dichlorophenyl)-2-imidazoline hydriodide and 3,4-dichlorobenzylamine according to the method of Example 59 provides the imidazoline product, m.p. 171°–173°C. (corr.) (from ethyl acetate).

Analysis. Calcd. for $C_{16}H_{13}Cl_4N_3 \cdot HI$ (percent): C, 37.16; H, 2.73; N, 8.13. Found (percent): C, 36.94; H, 2.80; N, 8.09.

EXAMPLE 68

4-(3,4-Dichlorophenyl)-2-(4-chlorobenzyl-amino-2-imidazoline hydriodide.

Reaction of 2-methylthio-4-(3,4-dichlorophenyl)-2-imidazoline hydriodide and 4-chlorobenzylamine according to the method of Example 59 provides the imidazoline, 4-(3,4-dichlorophenyl)-2-(4-chlorobenzylamino)-2-imidazoline. The hydriodide salt is prepared from the imidazoline base by acidifying with HI in an inert solvent and has a melting point of 116°–119°C. (corr.) (from isopropanol-isopropyl ether).

Analysis. Calcd. for $C_{16}H_{14}Cl_3N_3 \cdot HI$ (percent): C, 39.82; H, 3.13; N, 8.71. Found (percent): C, 39.87; H, 3.14; N, 8.64.

EXAMPLE 69

4-(3,4-Dichlorophenyl)-2-(allylamino)-2-imidazoline.

Reaction of 2-methylthio-4-(3,4-dichlorophenyl)-2-imidazoline and allylamine hydrochloride according to the procedure of Example 59 provides the imidazoline, 4-(3,4-dichlorophenyl)-2-(allylamino)-2-imidazoline. Various salts can be prepared by dissolving or suspending the imidazoline base in an inert solvent and acidifying with an appropriate acid. There can be mentioned by way of example salts such as:

4-(3,4-dichlorophenyl)-2-(allylamino)-2-imidazoline hydrochloride,
4-(3,4-dichlorophenyl)-2-(allylamino)-2-imidazoline fumarate,
4-(3,4-dichlorophenyl)-2-allylamino)-2-imidazoline hydriodide, and
4-(3,4-dichlorophenyl)-2-allylamino-2-imidazoline hemimucate.

EXAMPLE 70

4-(3,4-Dichlorophenyl)-2-(cyclopropylamino)-2-imidazoline.

Reaction of 2-methylthio-4-(3,4-dichlorophenyl)-2-imidazoline and cyclopropylamine hydrochloride according to the procedure of Example 63 provides the imidazoline, 4-(3,4-dichlorophenyl)-2-(cyclopropylamino)-2-imidazoline. Various salts can be prepared from the imidazoline base by dissolving or suspending the imidazoline base in an inert solvent and acidifying with an appropriate acid. There can be mentioned by way of example salts such as:

4-(3,4-dichlorophenyl)-2-(cyclopropylamino)-2-imidazoline hydrochloride,
4-(3,4-dichlorophenyl)-2-(cyclopropylamino)-2-imidazoline hydriodide, m.p. 149°–151°C. (from ethyl acetate),
4-(3,4-dichlorophenyl)-2-(cyclopropylamino)-2-imidazoline fumarate, and
4-(3,4-dichlorophenyl)-2-(cyclopropylamino)-2-imidazoline hemimucate.

EXAMPLE 71

4-(3,4-Dichlorophenyl)-2-(benzyl)-2-imidazoline hydriodide.

Reaction of 2-methylthio-4-(3,4-dichlorophenyl)-2-imidazoline hydriodide and benzylamine according to the method of Example 59 provides the imidazoline, 4-(3,4-dichlorophenyl)-2-(benzylamino)-2-imidazoline hydriodide, m.p. 151.5°–153°C. (corr.) (from ethyl acetate).

Analysis. Calcd. for $C_{16}H_{15}Cl_2N_3 \cdot HI$ (percent): C, 42.88; H, 3.60; N, 9.38. Found (percent): C, 43.05; H, 3.59; N, 9.49.

EXAMPLE 72

4-(4-Chlorophenyl)-2-(3,4-dichlorobenzylamino)-2-imidazoline hydriodide.

Reaction of 2-methylthio-4-(4-chlorophenyl)-2-imidazoline hydriodide and 3,4-dichlorobenzylamine according to the method of Example 59 provides the imidazoline, 4-(4-chlorophenyl)-2-(3,4-dichlorobenzylamino)-2-imidazoline. The hydriodide salt is prepared from the imidazoline base by acidifying with HI in inert solvent and has a melting point of 152°–154°C. (corr.) (from ethyl acetate).

Analysis. Calcd. for $C_{16}H_{14}Cl_3N_3 \cdot HI$ (percent): C, 39.82; H, 3.13; N, 8.71. Found (percent): C, 39.61; H, 3.20; N, 8.62.

STARTING MATERIALS

The various phenylethylenediamines employed in the foregoing examples and intermediates required for their preparation are obtained by methods described as follows.

A. PREPARATION OF α-AMINOPHENYLACETONITRILES

1. α-(Benzylamino)-2-chlorophenylacetonitrile hydrochloride.

2-Chlorobenzaldehyde (154.3 g., 1.1 mole) in 400 ml. of methanol is added in one portion to sodium cyanide (54 g., 1.1 mole) and benzylamine hydrochloride (158 g., 1.1 mole) in 400 ml. of water. The mixture is stirred for a period of 5 hr. and then diluted with one liter of water. The diluted mixture is extracted with four 500 ml. portions of ether; the ether extracts combined and dried over potassium carbonate. Acidification of the ethereal extract with ethanolic hydrogen chloride provides 269 g., of α-(benzylamino)-2-chlorophenyl-acetonitrile having a melting point of 149°–156°C. Crystallization from acetone-isopropyl ether provides material with a melting point of 154°–156°C.

Analysis. Calcd.: C, 61.44; H, 4.81; N, 9.56. Found: C, 62.21; H, 4.92; N, 9.68. 9.56.

Following the procedure described above for α-(benzylamino)-2-chlorophenylacetonitrile hydrochloride but employing equimolar amounts of the following benzaldehydes:

2,4-dichlorobenzaldehyde,
3-methylbenzaldehyde,
4-methylbenzaldehyde,
4-methoxybenzaldehyde,
4-biphenylcarboxaldehyde,
3-chlorobenzaldehyde,
3-trifluoromethylbenzaldehyde,
4-trifluoromethylbenzaldehyde, in place of 2-chlorobenzaldehyde, there is produced:

2. α-(benzylamino)-2,4-dichlorophenylacetonitrile hydrochloride, m.p. 138°–144°C.;
3. α-(benzylamino)-3-methylphenylacetonitrile hydrochloride, m.p. 166°–170°C.;
4. α-(benzylamino)-4-methylphenylacetonitrile hydrochloride, m.p. 129°–132°C.
5. α-(benzylamino)-4-methoxyphenylacetonitrile hydrochloride;
6. α-(benzylamino)-4-biphenylacetonitrile hydrochloride, m.p. 150°–152°C.;
7. α-(benzylamino)-3-chlorophenylacetonitrile hydrochloride, m.p. 172°–178°C.;
8. α-(benzylamino)-3-trifluoromethylphenylacetonitrile hydrochloride;
9. α-(benzylamino)-4-trifluoromethylphenylacetonitrile hydrochloride.
10. α-Amino-4-chlorophenylacetonitrile hydrochloride.

A mixture of 4-chlorobenzaldehyde (80 g., 0.57 mole) and sodium bisulfite (59.2 g., 0.57 mole) in 300 ml. of water is stirred for 1.5 hr. at room temperature and then heated to 60°C. for 0.5 hr. Ammonium hydroxide (15N, 38 ml., 0.57 mole) is rapidly added to the mixture and stirring continued for 0.5 hr. at 60°C. After cooling the mixture to below 10°C., a solution of sodium cyanide (28 g., 0.57 mole) in 75 ml. of water is added over a 10 minute period and stirring continued for an additional 2.5 hr. at room temperature. Extraction of the mixture with chloroform, drying the chloroform extract over potassium carbonate and concentrating under reduced pressure provides a residual oil. The oil is taken up in 50 ml. of absolute ethanol and acidified with ethanolic hydrogen chloride. On addition of isopropyl ether, a precipitate forms which is collected and washed with isopropyl ether to provide 18.1 g. of α-amino-4-chlorophenylacetonitrile hydrochloride having a melting point of 174°–175°C.

Analysis. Calcd.: C, 47.31; H, 3.97; N, 13.80. Found: C, 47.52; H, 4.05; N, 13.69.

11. α-Amino-4-bromophenylacetonitrile hydrochloride.

To a slurry of sodium cyanide (13.2 g., 0.27 mole) and ammonium chloride (14.4 g., 0.027 mole) in 100 ml. of 1:9 water-dimethylsulfoxide is added 4-bromobenzaldehyde (25 g., 0.135 mole) in 150 ml. of dimethylsulfoxide in one portion. The mixture is stirred for 5 hr. and then quenched in 1.5 liters of water. Extraction of this mixture with ether, drying the ethereal extract over potassium carbonate and then acidifying with ethanolic hydrogen chloride provides α-amino-4-bromophenylacetonitrile hydrochloride, m.p. 180°–182°C.

12. α-Amino-4-benzyloxyphenylacetonitrile.

A solution of 4-benzyloxybenzaldehyde (41.5 g., 0.195 mole) in 400 ml. of acetonitrile is added in one portion to a solution of sodium cyanide (9.6 g.) and ammonium chloride (11.7 g.) in 400 ml. of water. The mixture is stirred overnight, filtered and the filter-cake washed with water to provide 11.1 g. of α-amino-4-benzyloxyphenylacetonitrile free base, m.p. 108°–112°C.

α-Amino-4-benzyloxyphenylacetonitrile hydrochloride prepared from the free base is purified by crystallization from absolute ethanol-isopropyl ether, m.p. 178°–179°C.

Analysis. Calcd.: C, 65.57; H, 5.50; N, 10.20. Found: C, 65.37; H, 5.21; N, 9.96.

13. α-Amino-2,6-dichlorophenylacetonitrile hydrochloride.

In the manner given above for (12) α-amino-4-benzyloxyphenylacetonitrile but employing methanol in place of acetonitrile, 2,6-dichlorobenzaldehyde, ammonium chloride, and sodium cyanide were reacted to give α-amino-2,6,dichlorophenylacetonitrile hydrochloride, m.p. 192°–200°C.

14. α-Amino-3,4-dichlorophenylacetonitrile hydrochloride.

In the manner given above for (11) α-amino-4- bromophenylacetonitrile, 3,4-dichlorobenzaldehyde, ammonium chloride and sodium cyanide were reacted to give α-amino-3,4-dichlorophenylacetonitrile hydrochloride, m.p. 184°–185°C.

15. α-(Benzylamino)-4-fluorophenylacetonitrile hydrochloride.

In the manner given above for (1) α-(benzylamino)-2-chlorophenylacetonitrile hydrochloride, 4-fluorobenzaldehyde substituted for 2-chlorobenzaldehyde provides α-(benzylamino)-4-fluorophenylacetonitrile hydrochloride, m.p. 127°–130°C.

16. α-(Benzylamino)-4-trifluoromethylphenylacetonitrile hydrochloride.

In the manner given above for (1) α-(benzylamino)-2-chlorophenylacetonitrile hydrochloride, 4-trifluoromethylbenzaldehyde provides α-(benzylamino)-4-trifluoromethylphenylacetonitrile hydrochloride, m.p. 152°–158°C.

17. α-(Benzylamino)-3-methoxyphenylacetonitrile hydrochloride.

In the manner given above for (1) α-(benzylamino)-2-chlorophenylacetonitrile hydrochloride, 3-methoxybenzylaldehyde provides α-(benzylamino)-3-methoxyphenylacetonitrile hydrochloride, m.p. 155°–158°C.

18. α-Amino-3-benzyloxyphenylacetonitrile hydrochloride.

In the manner given above for (11) α-amino-4-bromophenylacetonitrile hydrochloride, 3-benzyloxybenzaldehyde provides α-amino-3-benzyloxyphenylacetonitrile hydrochloride, m.p. 150°–160°C.

19. α-Amino-3,4-dimethoxyphenylacetonitrile hydrochloride.

In the manner given above for (10) α-amino-4-chlorophenylacetonitrile hydrochloride, 3,4-dimethoxybenzaldehyde provides α-amino-3,4-dimethoxyphenylacetonitrile hydrochloride, m.p. 173°–175°C. Crystallization from isopropyl ether-absolute ethanol affords analytically pure material, m.p. 173°–175°C. (corr.).

Analysis. Calcd. (percent): C, 52.52; H, 5.73; N, 12.25. Found (percent): C, 52.81; H, 5.60; N, 12.19.

20. α-Amino-3,4-dibenzyloxyphenylacetonitrile hydrochloride.

In the manner given above for (11) α-amino-4-bromophenylacetonitrile hydrochloride, 3,4-dibenzyloxybenzaldehyde provides α-amino-3,4-dibenzyloxyphenylacetonitrile hydrochloride, m.p. 168°–171°C.

B. PREPARATION OF 1-PHENYLETHYLENEDIAMINES 1. 1-(2,6-Dichlorophenyl)ethylenediamine dihydrochloride.

α-Amino-2,6-dichlorophenylacetonitrile hydrochloride (24 g., 0.1 mole) is converted to the free base with 10% sodium hydroxide. To a tetrahydrofuran solution (350 ml.) of the free base (24 g., 0.1 mole) is added 225 ml. of 1 molar diborane in tetrahydrofuran over a period of 0.5 hr. under a nitrogen atmosphere. After stirring for 0.5 hr., the mixture is first hydrolyzed by the careful addition of 100 ml. of water and then concentrated under reduced pressure to provide an oil. This residual oil is taken up in ethanol and acidified with ethanolic hydrogen chloride (36 ml., 5.6N, 0.2 mole). Evaporation of the acidified solution under reduced pressure and treatment with 10% sodium hydroxide provides the free amine which is isolated by extracting the basified mixture with chloroform, drying the chloroform extract over potassium carbonate, and concentrating in vacuo. The residual oil thus obtained is taken up in ethanolic hydrogen chloride (27 ml., 5.6N, 0.15 mole) and diluted with an equal volume of isopropyl ether to provide 19.0 g., (68%) of 1-(2,6-dichlorophenyl)ethylenediamine dihydrochloride, m.p. 329°–331°C.

Following the procedure described above for 1-(2,6-dichlorophenyl)ethylenediamine dihydrochloride but employing equimolar amounts of the following α-aminophenylacetonitriles:

α-amino-4-chlorophenylacetonitrile,
α-amino-4-bromophenylacetonitrile,
α-amino-4-benzyloxyphenylacetonitrile,
α-(benzylamino)-3-trifluoromethylphenylacetonitrile,
α-(benzylamino)-4-trifluoromethylphenylacetonitrile, in place of α-amino-2,6-dichlorophenylacetonitrile, there is produced:

2. 1-(4-chlorophenyl)ethylenediamine dihydrochloride, m.p. 285°–288°C.;
3. 1-(4-bromophenyl)ethylenediamine dihydrochloride, m.p. 300°–305°C.;
4. 1-(4-benzyloxyphenyl)ethylenediamine dihydrochloride, m.p. 246°–253°C.;
5. α-(benzylamino)-3-trifluoromethylphenethylamine dihydrochloride,
6. α-(benzylamino)-4-trifluoromethylphenethylamine dihydrochloride.
7. β-(Benzylamino)-2-chlorophenethylamine dihydrochloride.

α-(Benzylamino)-2-chlorophenylacetonitrile hydrochloride is converted to the free base by treatment with 10% sodium hydroxide. A solution of α-benzylamino-2-chlorophenyl-acetonitrile (64.2 g., 0.25 mole) in 500 ml. of anhydrous ether is added to a stirred suspension of lithium aluminum hydride (38 g., 1 mole) in 1 liter of anhydrous ether under a nitrogen atmosphere over a 0.5 hr. period at 0°C. After the addition is complete, the mixture is stirred at 0°C. for 5 hr. and then at room temperature overnight. Hydrolysis of the reaction mixture is carried out by the sequential addition of water (38 ml.), 15% sodium hydroxide (38 ml.) and a 70 ml. portion of water. Filtration of the mixture removes inorganic material and addition of 5N ethanolic hydrogen chloride (130 ml., 0.65 mole) to the filtrate provides 82 g., (97%) of β-(benzylamino)-2-chlorophenethylamine dihydrochloride, m.p. 216°–219°C.

Following the procedure described above for β-benzylamino-2-chlorophenethylamine dihydrochloride but employing equimolar amounts of the following 2-(benzylamino)phenylacetonitriles:

α-(benzylamino)-2,4-dichlorophenylacetonitrile,
α-(benzylamino)-3-methylphenylacetonitrile,
α-(benzylamino)-4-methylphenylacetonitrile,
α-(benzylamino)-4-methoxyphenylacetonitrile,
α-(benzylamino)-4-biphenylacetonitrile,
α-(benzylamino)-3-chlorophenylacetonitrile,
α-amino-3,4-dichlorophenylacetonitrile, in place of α-(benzylamino)-2-chlorophenylacetonitrile, there is produced:

8. β-(benzylamino)-2,4-dichlorophenethylamine dihydrochloride, m.p. 239°–241°C.;

9. β-(benzylamino)-3-methylphenethylamine dihydrochloride, m.p. 175°-180°C.;
10. β-(benzylamino)-4-methylphenethylamine dihydrochloride, m.p. 312°-315°C.;
11. β-(benzylamino)-4-methoxyphenethylamine dihydrochloride;
12. β-(benzylamino)-4-biphenylethylamine dihydrochloride, m.p. 257°-259°C.;
13. β-(benzylamino)-3-chlorophenethylamine dihydrochloride, m.p. 225°-230°C.;
14. β-amino-3,4-dichlorophenethylamine dihydrochloride, m.p. 283°-285°C.
15. 1-(2-Chlorophenyl)ethylenediamine dihydrochloride.

A suspension of β-(benzylamino)-2-chlorophenethylamine dihydrochloride (33.4 g., 0.1 mole) in 200 ml. of methanol is debenzylated by hydrogenating over 10% palladium on carbon catalyst at 50 p.s.i. or atmospheric pressure in a hydrogenation apparatus. Before charging the hydrogenation vessel with the catalyst, the catalyst is first treated in a beaker with small portions of methanol. The methanol solvent is allowed to ignite and the flame is immediately smothered with a watch glass. When the catalyst no longer ignites freshly added methanol, it is washed into the hydrogenation vessel and the reduction carried out. After one molar equivalent of hydrogen is taken up, the catalyst is collected and the filtrate evaporated under reduced pressure. Crystallization of the residue thus obtained from methanol-isopropyl ether provides analytically pure 1-(2-chlorophenyl)ethylenediamine dihydrochloride, m.p. 299°-301°C.

Analysis. Calcd.: C, 39.45; H, 5.38; N, 11.50. Found: C, 39.52; H, 5.47; N, 11.58.

Two equivalents of d-camphorsulfonic acid is added to one equivalent of dl-(2-chlorophenyl ethylenediamine in ethanol. Successive crystallizations from ethanol affords optically pure l-1-(2-chlorophenyl)ethylenediamine di-d-camphorsulfonate salt, m.p. 244-248°C.; $[\alpha]_D^{25}$ + 6.5 (c = 1, H$_2$O).

The d-camphorsulfonate mother liquors which are enriched with the d-diamine are concentrated under reduced pressure and the residue converted to free diamine with 10% sodium hydroxide and then to the l-tartaric acid salt. Successive crystallizations for ethanol-water affords optically pure d-1-(2-chlorophenyl)ethylenediamine l-tartrate salt, m.p. 206°-209°C.; $[\alpha]_D^{25}$ −5.0 (c = 1, H$_2$O).

Following the procedure described above for 1-(2-chlorophenyl)ethylenediamine dihydrochloride but employing equimolar amounts of the following β-benzylaminophenethylamine dihydrochlorides:

β-(benzylamino)-2,4-dichlorophenethylamine dihydrochloride,
β-(benzylamino)-3-methylphenethylamine dihydrochloride,
β-(benzylamino)-4-methylphenethylamine dihydrochloride,
β-(benzylamino)-4-methoxyphenethylamine dihydrochloride,
β-(benzylamino)-4-biphenylethylamine dihydrochloride,
β-(benzylamino)-3-chlorophenethylamine dihydrochloride,
β-(benzylamino)-3-trifluoromethylphenethylamine dihydrochloride,
β-(benzylamino)-4-trifluoromethylphenethylamine dihydrochloride, in place of β-(benzylamino)-2-chlorophenethylamine dihydrochloride, there is produced:

16. 1-(2,4-dichlorophenyl)ethylenediamine dihydrochloride, m.p. 305°-310°C.;
17. 1-(3-methylphenyl)ethylenediamine dihydrochloride, m.p. 238°-243°C.;
18. 1-(4-methylphenyl)ethylenediamine dihydrochloride, m.p. 312°-315°C.;
19. 1-(4-methoxyphenyl)ethylenediamine dihydrochloride, m.p. 264°-266°C.;
20. 1-(4-biphenyl)ethylenediamine dihydrochloride, m.p. 325°-327°C.;
21. 1-(3-chlorophenyl)ethylenediamine dihydrochloride, m.p. 275°-278°C.;
22. 1-(3-trifluoromethylphenyl)ethylenediamine dihydrochloride;
23. 1-(4-trifluoromethylphenyl)ethylenediamine dihydrochloride.
24. 1-(4-Fluorophenyl)ethylenediamine dihydrochloride, m.p. 255°-265°C. Prepared by debenzylation of β-(benzylamino)-4-fluorophenethylamine dihydrochloride, m.p. 229°-232°C., obtained by lithium aluminum hydride reduction of α-(benzylamino)-4-fluorophenylacetonitrile.
25. 1-(4-Trifluoromethylphenyl)ethylenediamine dihydrochloride, m.p. 259°-261°C. Prepared by debenzylation of β-(benzylamino)-4-trifluoromethylphenethylamine, m.p. 242.5°-245°C. obtained by reduction of β-(benzylamino)-4-trifluorophenylacetonitrile with diisobutyl aluminum hydride.
26. 1-(3-Methoxyphenyl)ethylenediamine dihydrochloride, m.p. 245°-250°C. Prepared by debenzylation of β-(benzylamino)-3-methoxyphenethylamine dihydrochloride obtained by reduction of α-(benzylamino)-3-methoxyphenylacetonitrile with lithium aluminum hydride.
27. 1-(3-Benzyloxyphenyl)ethylenediamine dihydrochloride m.p. 225°-235°C. prepared by reduction of α-amino-3-benzyloxyphenylacetonitrile with lithium aluminum hydride.
28. 1-(3,4-Dimethoxyphenyl)ethylenediamine dihydrochloride, m.p. 258°-261°C. Prepared by catalytic reduction of α-amino-3,4-dimethoxyphenylacetonitrile hydrochloride employing platinum oxide in ethanol with a molar equivalent of hydrogen chloride.
29. 1-(3,4-Dibenzyloxyphenyl)ethylenediamine dihydrochloride, m.p. 241°-243°C. Prepared by lithium aluminum hydride reduction of α-amino-3,4-dibenzyloxyphenylacetonitrile.
30. 1-(3-Chlorophenyl)ethylenediamine dihydrochloride, m.p. 255°-270°C. Prepared by lithium aluminum hydride reduction of α-amino-3-chlorophenylacetamide.

C. PREPARATION OF 4-SUBSTITUTED-2-METHYLTHIO-2-IMIDAZOLINES.

1. 2-Methylthio-4-(2-chlorophenyl)-2-imidazoline hydriodide.

An aqueous solution of 1-(2-chlorophenyl)ethylenediamine dihydrochloride (51 g., 0.197 mole) is converted to the free base by treating with 50% sodium hydroxide. Isolation of the free base is carried out in the usual manner by extracting the basified solution with chloroform, drying the chloroform extract over potassium carbonate, and concentrating the dried solution under reduced pressure. Residual free base in taken up in 400 ml. of 80% ethanol and 12 ml. (15 g., 0.197 mole) of carbon disulfide is added in one portion. After stirring and refluxing the mixture for 1 hr., 1.5 ml. of concentrated hydrochloric acid is added and the mixture stirred for 10 hr. at reflux and then at room temperature for an additional 10 hr. period. The mixture filtered, washed with water, and dried provides 11.0 g. (73%) of 4-(2-chlorophenyl)-2-thio-2-imidazoline, m.p. 210°-212°C.

A solution of 4-(2-chlorophenyl)-2-thio-2-imidazoline (11.0 g., 0.052 mole) and 3.6 ml. (8.1 g., 0.057 mole) of methyl iodide in 75 ml. of isopropanol is refluxed for 3 hr. and the mixture concentrated in vacuo to approximately one-half volume. Dilution of the concentrated mixture with 1 liter of isopropyl ether provides 17.3 g., (94%) of product having a m.p. of 155°-160°C. Crystallization from absolute ethanol-isopropyl ether provides analytically pure 2-methylthio-4-(2-chlorophenyl)-2-imidazoline hydriodide, m.p. 164°-167°C.

Analysis. Calcd.: C, 33.86; H, 3.41; N, 7.90. Found: C, 33.74; H, 3.40; N, 7.63

Following the procedure described above for 2-methylthio-4-(2-chlorophenyl)-2-imidazoline but employing equimolar amounts of the following 1-phenylethylenediamines:

1-(4-chlorophenyl)ethylenediamine,
1-(2,4-5-trimethylphenyl)ethylenediamine,
β-benzylamino-4-chlorophenethylamine,
β-methylamino-4-chlorophenethylamine,
1-(4-n-butoxyphenyl)ethylenediamine,
(4-biphenylyl)ethylenediamine,
1-(4-isopropylphenyl)ethylenediamine,
1-(4'-chlorobiphenylyl)ethylenediamine,
1-(2,4,6-trichlorophenyl)ethylenediamine,
1-(3-methyl-4,6-dichlorophenyl)ethylenediamine,
1-phenylethylenediamine, in place of 1-(2-chlorophenyl)ethylenediamine there is produced:

2. 2-methylthio-4-(4-chlorophenyl)-2-imidazoline hydriodide,
3. 2-methylthio-4-(2,4,6-trimethylphenyl)-2-imidazoline hydriodide,
4. 2-methylthio-3-benzyl-4-(4-chlorophenyl)-2-imidazoline hydriodide,
5. 2-methylthio-3-methyl-4-(4-chlorophenyl)-2-imidazoline hydriodide,
6. 2-methylthio-4-(4-n-butoxyphenyl)-2-imidazoline hydriodide,
7. 2-methylthio-4-(4-biphenylyl)-2-imidazoline hydriodide,
8. 2-methylthio-4-(4-isopropylphenyl)-2-imidazoline hydriodide,
9. 2-methylthio-4-(4'-chloro-4-biphenylyl)-2-imidazoline hydriodide,
10. 2-methylthio-4-(2,4,6-trichlorophenyl)-2-imidazoline hydriodide,
11. 2-methylthio-4-(3-methyl-4,6-dichlorophenyl)-2-imidazoline hydriodide,
12. 2-methylthio-4-phenyl-2-imidazoline hydriodide, m.p. 196.5°-198.5°C. (corr.).

While several specific embodiments are disclosed in the foregoing specification, it will be appreciated by those skilled in the art that other modifications may be made without departing from the spirit and scope of the appended claims.

What is claimed is:

1. A compound selected from the group consisting of imidazolines having formula

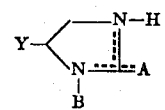

and non-toxic pharmaceutically acceptable acid addition salts thereof wherein

B is hydrogen, lower alkyl or benzyl;
Y is selected from the group consisting of phenyl and an R-phenyl radical of the formula

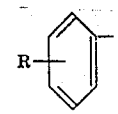

wherein when Y is said phenyl,
A is selected from the group consisting of benzylamino, halobenzylamino, 3-dimethylaminopropylamino;

wherein when Y is said R-phenyl radical,
R is halogen, lower alkyl, benzyloxy, lower alkoxy, lower dialkoxy, 3-hydroxy, 3,4-dihydroxy, trifluoromethyl, phenyl, 4-halophenyl, or 4-(lower alkyl)-phenyl with the proviso that when R is selected from the group consisting of halogen and lower alkyl the phenyl ring can have up to two additional substituents independently selected from the group consisting of halogen and lower alkyl; and
A is amino, hydroxyamino, lower alkylamino, benzylamino, halobenzylamino, dihalobenzylamino, allylamino, cycloalkylamino, hydrazino, halobenzylidenehydrazino, dihalobenzylidenehydrazino, or alkylidenehydrazino from two to six carbon atoms inclusive.

2. The compound of the group defined in claim 1 which is 2-amino-4-(2-chlorophenyl)-2-imidazoline.

3. The compound of the group defined in claim 1 which is 2-amino-4-(2-chlorophenyl)-2-imidazoline hydrobromide.

4. The compound of the group defined in claim 1 which is 4-(2-chlorophenyl)-2-hydrazino-2-imidazoline.

5. The compound of the group defined in claim 1 which is 4-(2-chlorophenyl)-2-hydrazino-2-imidazoline hydriodide.

6. The compound of the group defined in claim 1 which is 4-(2-chlorophenyl)-2-isopropylidenehydrazino-2-imidazoline.

7. The compound of the group defined in claim 1 which is 4-(2-chlorophenyl)-2-isopropylidenehydrazino-2-imidazoline hydriodide.

8. The compound of the group defined in claim 1 which is 2-amino-4-(4-chlorophenyl)-2-imidazoline.

9. The compound of the group defined in claim 1 which is 2-amino-4-(4-chlorophenyl)-2-imidazoline hydrobromide.

10. The compound of the group defined in claim 1 which is 2-amino-4-(4-bromophenyl)-2-imidazoline.

11. The compound of the group defined in claim 1 which is 2-amino-4-(4-bromophenyl)-2-imidazoline hydrobromide.

12. The compound of the group defined in claim 1 which is 2-amino-4-(2,4-dichlorophenyl)-2- imidazoline.

13. The compound of the group defined in claim 1 which is 2-amino-4-(2,4-dichlorophenyl)-2-imidazoline hydrobromide.

14. The compound of the group defined in claim 1 which is 2-amino-4-(2,6-dichlorophenyl)-2-imidazoline.

15. The compound of the group defined in claim 1 which is 2-amino-4-(2,6-dichlorophenyl)-2-imidazoline hydrobromide.

16. The compound of the group defined in claim 1 which is 2-amino-4-(p-tolyl)-2-imidazoline.

17. The compound of the group defined in claim 1 which is 2-amino-4-(p-tolyl)-2-imidazoline hydrobromide.

18. The compound of the group defined in claim 1 which is 2-amino-4-(4-biphenylyl)-2-imidazoline.

19. The compound of the group defined in claim 1 which is 2-amino-4-(4-biphenylyl)-2-imidazoline hydrobromide.

20. The compound of the group defined in claim 1 which is 2-amino-4-(3,4-dichlorophenyl)-2-imidazoline.

21. The compound of the group defined in claim 1 which is 2-amino-4-(3,4-dichlorophenyl)-2-imidazoline hydrobromide.

22. The compound of the group defined in claim 1 which is 4-(4-chlorophenyl)-2-(methylamino)-2-imidazoline.

23. The compound of the group defined in claim 1 which is 4-(4-chlorophenyl)-2-(methylamino)-2-imidazoline hemimucate.

24. The compound of the group defined in claim 1 which is 2-amino-4-[3,4-dimethoxyphenyl]-2-imidazoline.

25. The compound of the group defined in claim 1 which is 2-amino-4-[3,4-dimethoxyphenyl]-2-imidazoline hydrobromide.

26. The compound of the group defined in claim 1 which is 2-benzylamino-4-phenyl-2-imidazoline.

27. The compound of the group defined in claim 1 which is 2-benzylamino-4-phenyl-2-imidazoline fumarate.

28. The compound of the group defined in claim 1 which is 2-(4-chlorobenzylamino)-4-phenyl-2-imidazoline.

29. The compound of the group defined in claim 1 which is 2-(4-chlorobenzylamino)-4-phenyl-2-imidazoline fumarate.

* * * * *

UNITED STATES PATENT OFFICE
CERTIFICATE OF CORRECTION

PATENT NO. : 3,821,244

DATED : June 28, 1974

INVENTOR(S) : William Lesley Matier and William Timmey Comer

It is certified that error appears in the above-identified patent and that said Letters Patent are hereby corrected as shown below:

Title page, first column at entry identified as "[75]", change "William Timmey" to read--William Timmey Comer--.

Title page, first column at entry identified as "[63]", change "Jan." to read--August--.

Table II bridging columns 9, 10, and 11, 12, change the following:

Example 16, delete "(35 ± 66)" under column entitled "Actual B. P. Decrease" and insert under column "Area Under % Decrease Time Curve;

Example 27, change "(** ± 56)" to read--(157 ± 56)--;

Example 33, delete "(297 ± 52)" under column entitled "Actual B. P. Decrease" and insert under column entitled "Area Under % Decrease Time Curve";

Example 62, delete "(450 ± 66)" under column entitled "Actual B. P. Decrease" and insert under column entitled "Area Under % Decrease Time Curve".

Page 2

UNITED STATES PATENT OFFICE
CERTIFICATE OF CORRECTION

PATENT NO. : 3,821,244
DATED : June 28, 1974
INVENTOR(S) : William Lesley Matier and William Timmey Comer It is certified that error appears in the above-identified patent and that said Letters Patent are hereby corrected as shown below:

Example 63, delete "(522 ± 107)" from column entitled "Actual B. P. Decrease" and insert under column entitled "Area Under % Decrease Time Curve".

Table III bridging columns 15 and 16, Example 14 under column "R", change 4-$C_6H_5O$" to read--4-$C_6H_5CH_2O$--.

Column 20, line 60 change "(benzyl)" to read--(benzylamino)--.

In the Claims:

Claim 1, line 2, after "having" insert "the".

Claim 1, delete "--." as part of formula pictured at lines 4-10.

Signed and Sealed this twenty-fifth Day of November 1975

[SEAL]

Attest:

RUTH C. MASON
Attesting Officer

C. MARSHALL DANN
Commissioner of Patents and Trademarks